United States Patent [19]
Ramsey et al.

[11] Patent Number: 5,107,108
[45] Date of Patent: Apr. 21, 1992

[54] PROGRAMMABLE CONTROLLED-EXPOSURE RADON MEASUREMENT SYSTEM

[75] Inventors: Paul R. Ramsey, Woodsboro; Lorin R. Stieff, Kensington, both of Md.

[73] Assignee: Rad Elec Inc., Frederick, Md.

[21] Appl. No.: 541,792

[22] Filed: Jun. 21, 1990

[51] Int. Cl.[5] ............................. G01T 1/02; G01T 1/14
[52] U.S. Cl. ...................................... 250/253; 250/255; 250/336.1
[58] Field of Search ............... 250/253, 255, 380, 379, 250/336.1

[56] References Cited

U.S. PATENT DOCUMENTS

| | | | |
|---|---|---|---|
| 2,833,928 | 5/1958 | Parsons | 250/349 |
| 3,641,439 | 2/1972 | Aslan | 250/336.1 |
| 4,055,762 | 10/1977 | Durkin | 250/253 |
| 4,286,155 | 8/1981 | Utting | 250/380 X |
| 4,853,536 | 8/1989 | Dempsey et al. | 250/253 |

OTHER PUBLICATIONS

Breslin et al., "An Improved Time-Integrating Radon Monitor" U.S. Department of Energy, Environmental Measurements Lab, N.Y., Nov. 20-22, 1978, pp. 1-6.

Guggehneim et al., "A Time-Integrating Environmental Radon Daughter Monitor", Health Physics, vol. 36, Mar., pp. 452-455.

Primary Examiner—Constantine Hannaher
Assistant Examiner—Edward J. Glick
Attorney, Agent, or Firm—Cushman, Darby & Cushman

[57] ABSTRACT

A programmable controlled-exposure radon measurement system includes a radon detector of the type that is programmably inhibited or enabled at selected times to effect randon measurement. In the preferred embodiment, a radon detector of the type having an electret within a chamber is located at the test site and the container opened and closed to the ambient atmosphere at selected times to limit exposure to certain intervals during the day for a selected number of successive days. The container is opening by an actuator, such as an electro-actuator or a fluidic actuator, under the control of a programmable controller, such as a 7-day timer or a stored program controlled microprocessor. A fail-safe function is provided by which the radon detector is inhibited in the event of a power failure to preserve test data up to the time of the power failure.

12 Claims, 3 Drawing Sheets

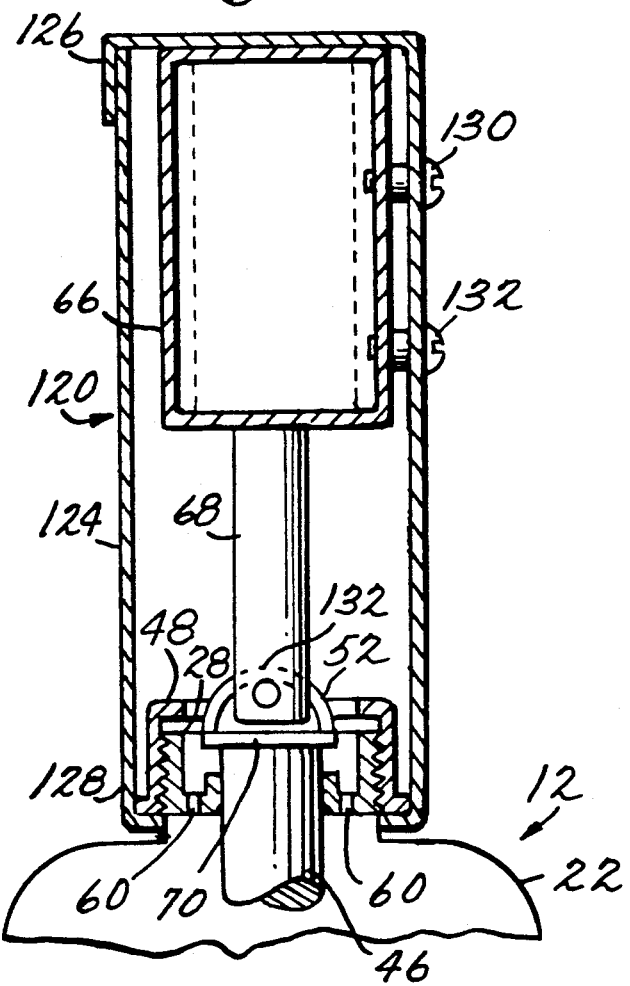
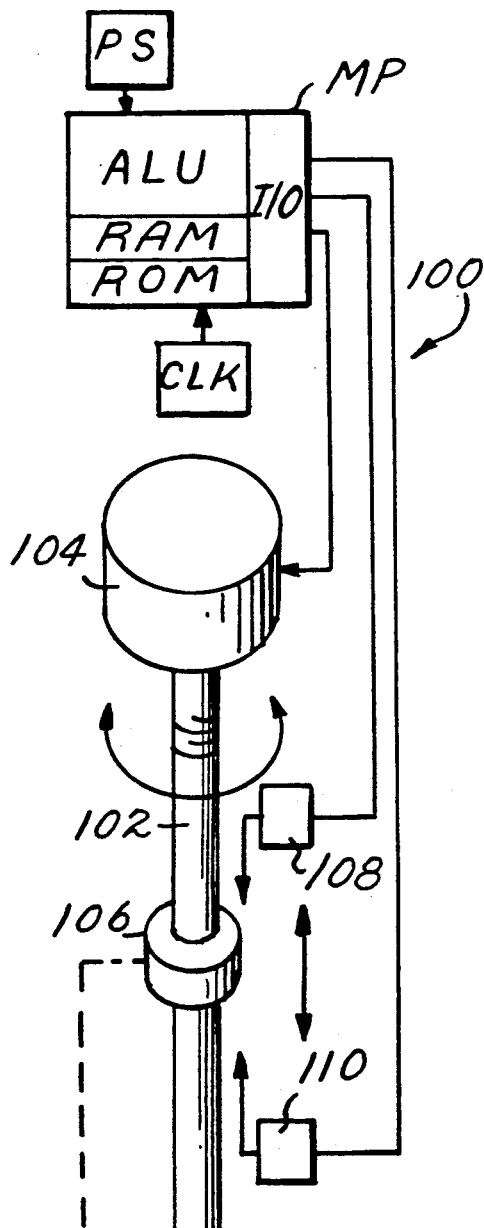
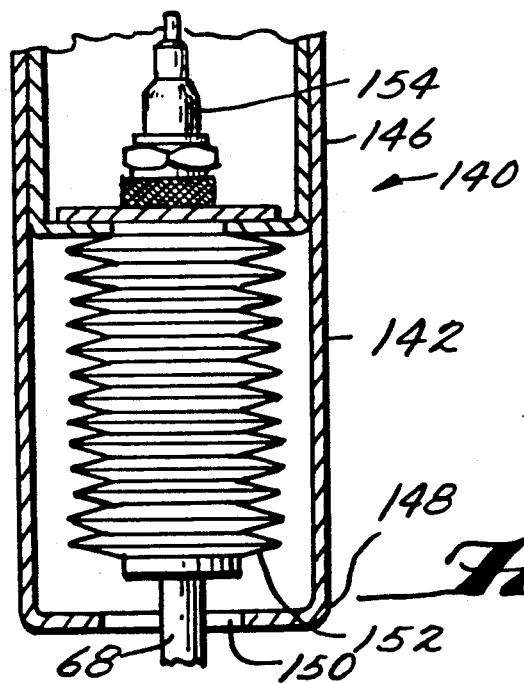

PROGRAMMABLE CONTROLLED-EXPOSURE RADON MEASUREMENT SYSTEM

BACKGROUND OF THE INVENTION

The present invention relates to a programmable controlled-exposure radon measurement system for determining the level of radon gas and its daughter products at a selected test site.

Various devices have been developed for the purpose of measuring radon and other radioactive gas concentrations in residential and commercial buildings. Such devices include charcoal collectors, alpha-track detectors, and electret detectors. Representative electret detectors are disclosed in U.S. patent application Ser. No. 07/409,695, now U.S. Pat. No. 4,992,658, filed Sept. 20, 1989 and entitled "An Electret Ion Chamber for Radon Monitoring" and U.S. Pat. No. 4,853,536 issued Aug. 1, 1989 and entitled "Ionization Chamber for Monitoring Radioactive Gas." These detectors are of the integrating type in that they continuously measure the average concentrations of radon or other radioactive gases over a period a several days or weeks.

Recently, governmental agencies have sought to obtain radon measurements of buildings that are occupied only part of the time in an effort to obtain data that is more representative of actual occupant-exposure levels. For example, a continuous integrating monitor may not provide appropriate occupant-exposure data at school classroom test sites in which the classrooms are occupied for an 8-hour period each weekday and otherwise unoccupied. Some monitoring devices, such as those disclosed in the above cited documents, can be selectively inhibited and enabled to effect the desired occupant-exposure monitoring. While manual operation is suitable for small-scale testing, the labor requirement becomes larger for a large number of sites that must be simultaneously monitored. For example, the labor requirement to monitor all classrooms within a 1000 classroom school system is uneconomic, and the probability of the monitoring devices being enabled and disabled at the proper time is not high.

SUMMARY OF THE INVENTION

In view of the above, it is an object of the present invention, among others, to provide a programmable controlled-exposure radon measurement system for measuring radon gas and daughter product concentrations during selected time periods over an extended test cycle.

It is another object of the present invention to provide a programmable controlled-exposure radon measurement system that can measure radon and daughter product concentrations during selected time periods of the day over a period of many days.

It is still another object of the present invention to provide a programmable controlled-exposure radon measurement system that can measure radon and daughter product concentrations during selected time periods of the day over a period of many days and which includes a fail safe feature that halts measurements in the event of a power failure.

In view of these objects, and others, the present invention provides a programmable controlled-exposure radon measurement system that measures radon and daughter product concentrations at a test site during selected exposure intervals. In its broadest form, the present invention provides a radon detector of the type that is programmably inhibited or enabled at selected times to effect radon measurement. In the preferred embodiment, a radon detector of the type having an electret within a container is located at the test site and the container opened and closed to the ambient atmosphere at selected times to limit exposure to certain intervals during the day for a selected number of successive or non-successive days. The container is opened by an actuator, such as an electro-actuator or a fluidic actuator, under the control of a programmable controller, such as a 7-day timer or a stored-program-controlled microprocessor. Additionally, the system can be provided with a fail-safe function by which the radon detector is inhibited in the event of a power failure to preserve test data up to the time of the power failure.

The present invention advantageously provides a programmable controlled-exposure radon measurement system by which measurements can be desirably taken at a test site during selected time intervals with a minimum of labor and in such a way that data is preserved in the event of a power failure.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 2A is a detailed structural view of the solenoid actuator shown in schematic form in FIG. 2 to selectively open and close the detector;

FIG. 3 is a detailed structural view of an alternate actuator in the form of an extendible and retractable pneumatic bellows to selectively open and close the detector;

FIG. 4 is a schematic block diagram of a microprocessor controlled lead screw arrangement.

DESCRIPTION OF THE PREFERRED EMBODIMENT

Figures 1, 2:
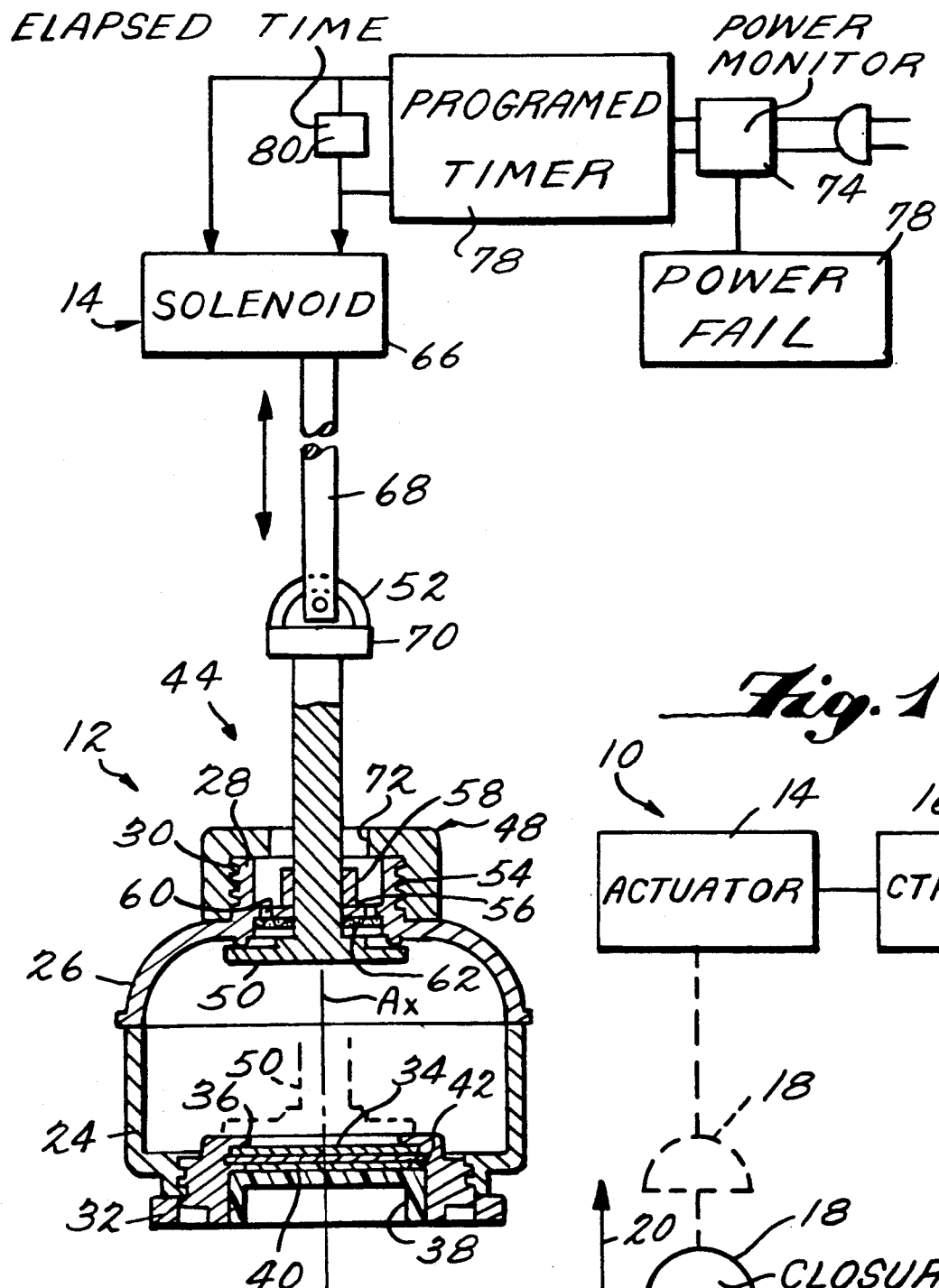
FIG. 1 is a schematic block diagram of a programmable controlled-exposure radon measurement system in accordance with the present invention.
FIG. 2 is a pictorial view, in partial cross-section, of an embodiment of the present invention utilizing a solenoid, shown in schematic form, to selectively open and close the detector.

A programmable controlled-exposure radon measurement system in accordance with the present invention is shown in functional block form in FIG. 1 and is designated generally therein by the reference character 10. As shown, the system 10 includes a radon detector 12, an actuator 14 for selectively enabling and disabling the detector 12, and programmed controller 16. The detector 12 is of the type that includes a closure 18 that is movable between a first position (solid-line illustration) during which the detector 12 is inoperative or otherwise inhibited from effecting its measurement function and a second position (dotted-line illustration) in which the detector 12 is operative or otherwise enabled for measurement. As indicated by the arrow 20, the closure is bi-directionally movable between its first and second positions. Suitable detectors include those disclosed in U.S. patent application Ser. No. 07/409,695, filed Sept. 20, 1989 and entitled "An Electret Ion Chamber for Radon Monitoring" and U.S. Pat. No. 4,853,536 issued Aug. 1, 1989 and entitled "Ionization Chamber for Monitoring Radioactive Gas," the disclosures of which are incorporated herein by reference.

As shown in FIG. 2, the detector 12 includes a housing 22 having a cylindrical lower portion 24 and a hemispherical upper portion 26. An upwardly extending, reduced diameter neck 28 that carries external threads 30 extends from the upper portion 24 of the housing 22. A generally circular base 32 is in threaded engagement with the open lower end of the housing 22. A disc-like electret 34 is carried in the base 32 and retained in place by an inwardly extending flange 36 that defines an opening (unnumbered) so that one side of the electret 34 is exposed to the interior volume of the housing 22. The electret 34 is held in place against the flange 36 by a plug 38 that is received within a bore (unnumbered) and which forces a conductive metal screen 40 and a layer of aluminum foil 42 against the back side of the electret 34. The base 32 and the housing 22 are formed as a body of revolution about a central axis $A_x$ and are preferably fabricated from an electrically conductive plastic (i.e., carbon-filled) or are provided with an electrically conductive coating on the interior surface.

The electret 34 is fabricated from Teflon ™ (polytetrafluoroethylene) that is initially charged by heating and cooling in a strong electrostatic field.

A keeper assembly, generally indicated at 44, is mounted in the neck 28 and is movable between an open position (solid-line illustration) and a closed position (dotted-line illustration). The keeper assembly 44 includes a stem 46 having a plug 70 secured to its upper end and a circular shield or disc 50 secured to its lower end. An attachment loop 52 is formed on the upper side of the plug 70 to aid in securing the keeper assembly 44 to its actuator 14. A cap 48 having a central aperture 72 is provided with internal threads 54 for engaging the threads 30 of the neck 28. The stem 46 is carried in an insert 56 that can be integrally molded as part of the upper portion 26. The insert 56 includes a cylindrical extension 58 which journals the stem 46 and an annular section (unnumbered) which includes at least one opening 60 that communicates with the interior of the housing 22 through a filter 62.

When the keeper assembly 44 is in its lowered position, the disc 50 (dotted-line illustration) shields the surface of the electret 34 from the interior of the housing 22 and effectively inhibits or turns-off the monitoring function of the electret 34. The stem plug 70 of the lowered keeper assembly 44 is positioned within the aperture 72. Conversely, when the keeper assembly 44 is in its upper or raised position (solid-line illustration), the plug 70 is displaced from the aperture 72 and the electret 34 is exposed to ions generated in the interior volume of the housing 22 as a consequence of radon entering the interior volume through the opening 60 and the filter 62. Charged particles attracted to the surface of the electret 34 as a consequence of the decay of radon gas and its daughter products are effective to diminish the electret charge and provide an indication of radon exposure as described in detail in the above-incorporated disclosures.

In the embodiment of FIG. 2, the actuator 14 takes the form of a bi-directional solenoid 66 that is connected by an operating rod or plunger 68 to the attachment loop 52 of the stem plug 70. The solenoid 66 has a stroke that is sufficient to move the keeper assembly 44 between its two positions as described above.

A preferred solenoid mounting assembly for the schematically represented solenoid 66 of FIG. 2 is shown in FIG. 2A and is generally designated therein by the reference character 120. As shown, the mounting assembly 120 includes a rectangular frame 124 having an upper portion 126 and a lower portion 128. The lower portion 128 of the frame assembly 120 includes an aperture (not shown) having a diameter somewhat larger than that of the neck 28 and smaller that the diameter of the cap 48. The frame 124 is mounted over the neck 28, as shown in FIG. 2, and secured in place by the cap 48 in threaded engagement with the neck 28. Fasteners 130 and 132, such as the threaded fasteners shown, secure the solenoid 66 to the frame 124 so that the plunger 68 is aligned with the stem 46. A pin 132 or other fastener connects the plunger 68 to the attachment loop 52.

The controller 16 shown in schematic fashion in FIG. 2 is preferably a 7-day timer 78 that is connected to a conventional power source and which can be programmed to operate the solenoid 66 to enable the detector 12 for operation by moving the keeper assembly 44 to its open position and inhibit operation by moving the keeper assembly 44 to its closed position on a recurring basis. In the context of radon testing at a public school, for example, the 7-day timer 78 can be programmed to enable the detector between 8:30 am to 3:15 pm during weekdays and inhibit the detector 12 during all other time periods. An elapsed-time hour counter 80 is connected to the 7-day timer 78 to measure the total number of exposure hours, and a power monitor 74 is connected to the power source. In the event a power failure is detected, a 'Power Interruption' indicator 76 is set to indicate a compromised test protocol.

In the embodiment of FIG. 2, the solenoid 66 is powered to raise the keeper assembly 44 to enable operation and unpowered to lower the keeper assembly and inhibit operation. The use of the solenoid 66 provides fail safe operation in the event of a power failure since the weight of the movable components of the solenoid 66 and the keeper assembly 44 are sufficient to automatically move the keeper assembly 44 to its closed position to inhibit further operation of the detector 12.

Figure 5:
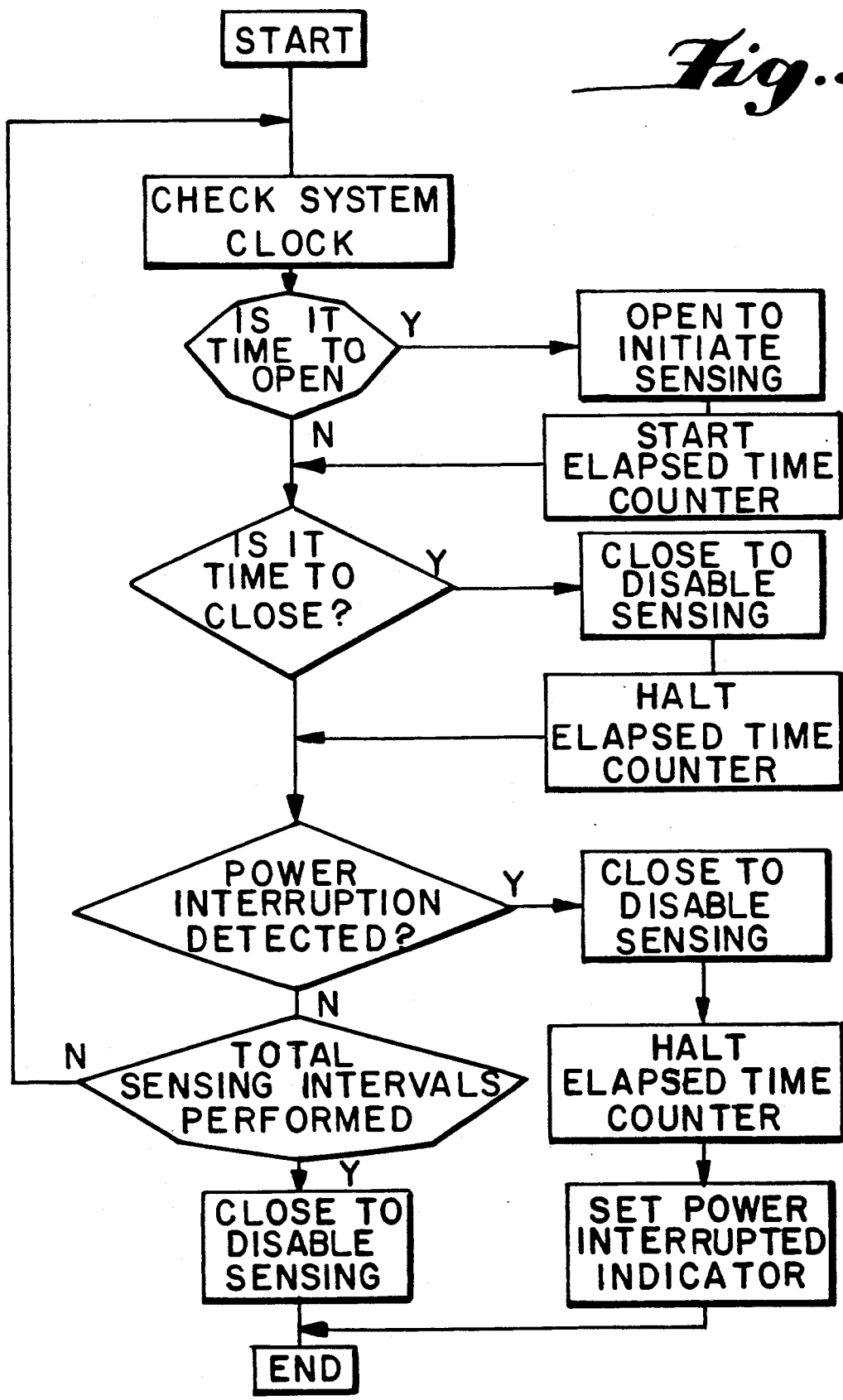
FIG. 5 is a flow diagram of an operational sequence for the controller of FIG. 4.

In addition to the solenoid 66 of FIGS. 2 and 2A, other suitable actuators include various mechanical devices including motor driven cams and/or lever mechanisms, bi-directional motor-driven rack-and-pinion drives, the representative fluidic actuator of FIG. 3, and the microprocessor controlled lead screw arrangement of FIGS. 4 and 5. In FIG. 3, a bellows mounting assembly, designated generally by the reference character 140, provides the functional equivalent of the solenoid mounting assembly of FIG. 2A. In FIG. 3, a rectangular frame 142 includes an upper portion 146 and a lower portion 148 with the lower portion 148 including an aperture 150 having a diameter somewhat larger than that of the neck 28 and smaller than that of the cap 48. The frame 142 is mounted over the neck 28 in a manner analogous to that shown in FIG. 2 and retained in place by the cap 48 in threaded engagement with the neck 28. An extendible and retractable bellows 152 is carried on the upper portion 146 of the frame 142 and includes a fitting 154 for connection to either a pressurized air source and/or a vacuum source (not shown). The plunger 68 at the lower end of the bellows 152 connects to the upper end of the stem 46 as described above for FIG. 2. As can be appreciated, the bellows 152 and its attached keeper assembly 44 can be readily extended or retracted. For example, when a reduced pressure source is provided to the bellows 152, the plunger 68 lifts the keeper assembly to open and thereby enable the detector 12 for operation as described above, and, conversely, when the pressure is normalized, the plunger 68 returns to its lower position to close or inhibit operation of the detector 12. The bellows 152 of FIG. 3 has the same fail-safe feature as that shown in FIG. 2 in that any failure of the bellows 152 or its reduced pressure source will cause the detector 12 to be closed and inhibited from operation.

In FIG. 4, a stored program microprocessor system, generally designated by the reference character 100, drives a motor/lead screw arrangement to effect control of the keeper assembly 44. The lead screw 102 is connected to the output of a reversible motor 104. A threaded nut 106 is mounted on the lead screw 102 and is connected to the keeper assembly 44 (dotted-line illustration) so that rotation of the lead screw 102 in one direction raises the keeper assembly 44 to enable the detector 12 for operation and rotation in the opposite direction lowers the keeper assembly 44 to inhibit operation. Limit switches 108 and 110 sense the upper and lower limits of the nut 106 and provide information to the microprocessor to prevent over travel.

The microprocessor, generally designated at MP, is of conventional design and includes an arithmetic logic unit for performing arithmetic and logical computation, several general purpose registers for storing intermediate results and variables, and a clock CLK for providing timing control. A ROM (read-only memory) stores instruction codes for controlling the operation of the microprocessor MP as discussed below and a RAM stores data for manipulation by the microprocessor MP. An input/output port I/O accepts signals for use during processing and provides output signals.

An auxiliary power source PS is provided in the event of a power failure to provide sufficient reserve power to drive the keeper assembly 44 to the closed position.

The embodiment of FIG. 4 operates in accordance with the flow control diagram of FIG. 5. After start-up, the system clock CLK is checked and a query is presented to determine if the time-to-open condition is present, and, if so, the motor 104 is operated to rotate the leadscrew 102 to raise the keeper assembly 44 until the nut 106 contacts the switch 108 to initiate sensing, and the elapsed-time register is incremented in response to the system clock CLK to record the cumulative exposure time. If the time-to-open condition is not present, a query is presented to determine if the time-to-close condition is present, and, if so, the motor 104 is operated to rotate the leadscrew 102 to lower the keeper assembly 44 until the nut 106 contacts the switch 110 to disable sensing, and the elapsed-time register is halted. If the time-to-close condition is not present, a query is then presented to determine if the main power source is operative and, if so, another query is presented to determine if the total number of exposure intervals has been completed, and, if so, the keeper assembly is closed and the test completed. If a power interrupt is sensed, the keeper assembly 44 is closed using the auxiliary power, the power-interrupt register is set, and the test is halted. As can be appreciated, the flow diagram of FIG. 5 is one of several that can be utilized in accordance with the present invention.

The present invention advantageously provides a programmable controlled-exposure radon measurement system by which measurements can be desirably taken at a test during selected time intervals with a minimum of labor and in such a way that data is preserved in the event of a power failure.

As will be apparent to those skilled in the art, various changes and modifications may be made to the illustrated programmable controlled-exposure radon measurement system of the present invention without departing from the spirit and scope of the invention as determined in the appended claims and their legal equivalents.

What is claimed is:

1. A controlled-exposure measurement system for measuring the presence of radon, comprising:
   a radon monitor having a housing containing an electret therein for accumulating ions in response to the decay of radon gas within the housing and a keeper assembly selectively movable between first and second positions, respectively, to expose said electret to the interior of said housing for enabling measurement of radon and to shield said electret from the interior of said housing to inhibit said electret;
   an actuator connected to said keeper assembly for moving said keeper assembly between said first and second positions; and
   a programmable timer connected to said actuator for moving said keeper assembly between said first and second positions in accordance with a preselected time sequence.

2. The system of claim 1, wherein said keeper assembly is moved along a linear path between its first and second positions.

3. The system of claim 2, wherein said actuator comprises an electrically powered solenoid, said solenoid having a plunger coupled to said keeper assembly for moving said keeper assembly to its second, inhibit position when said solenoid is unpowered and to its first, enable position when said solenoid is powered.

4. The system of claim 3, further comprising means to indicate the absence of power for powering said solenoid.

5. The system of claim 3, wherein said radon monitor includes a neck through which a portion of said keeper assembly extends, said system further comprising a frame for mounting said solenoid to said radon monitor, said frame having a portion thereof in engagement with said neck and another thereof portion to which said solenoid is mounted.

6. The system of claim 5, wherein said neck is threaded, said system further comprising a threaded cap for securing said frame to said threaded neck.

7. The system of claim 1, wherein said actuator comprises a reduced-pressure bellows, said bellows moving said keeper assembly to its first, enable position when connected to a source of reduced-pressure and to its second, inhibit position when not connected to a source of reduced-pressure.

8. The system of claim 1, wherein said actuator comprises a threaded lead screw mounted for rotation in a first and a second direction and a bi-directional motor for rotating said lead screw in one direction or the other, a nut mounted upon said lead screw and coupled to said keeper assembly for moving said keeper assembly toward and to its first, enable position in response to rotation of said lead screw in a first direction and toward and to its second, inhibit position in response to rotation of said lead screw in the other direction.

9. The system of claim 8, wherein said programmable timer comprising a stored-program controlled microprocessor for controlling said motor in accordance with a preselected time sequence.

10. The system of claim 9, further comprising a first limit switch to interrupt power to said motor when said keeper assembly is moved to said first position and a second limit switch to interrupt power to said motor when said keeper assembly is moved to said second position.

11. The system of claim 1, wherein said programmable timer comprising a stored-program controlled micro-processor for controlling said actuator in accordance with a preselected time sequence.

12. The system of claim 1, further comprising an elapsed time indicator for indicating the total time that said keeper assembly is in its first position.

* * * * *